US012732051B2

(12) United States Patent
Yokawa

(10) Patent No.: US 12,732,051 B2
(45) Date of Patent: Sep. 8, 2026

(54) THERMOSETTING RESIN COMPOSITION AND STATOR

(71) Applicant: SUMITOMO BAKELITE CO., LTD., Tokyo (JP)

(72) Inventor: Akitaka Yokawa, Tokyo (JP)

(73) Assignee: SUMITOMO BAKELITE CO., LTD., Tokyo (JP)

( * ) Notice: Subject to any disclaimer, the term of this patent is extended or adjusted under 35 U.S.C. 154(b) by 237 days.

(21) Appl. No.: 18/709,226

(22) PCT Filed: Nov. 10, 2022

(86) PCT No.: PCT/JP2022/041888
§ 371 (c)(1),
(2) Date: May 10, 2024

(87) PCT Pub. No.: WO2023/085357
PCT Pub. Date: May 19, 2023

(65) Prior Publication Data

US 2025/0038601 A1 Jan. 30, 2025

(30) Foreign Application Priority Data

Nov. 11, 2021 (JP) ................................ 2021-183829

(51) Int. Cl.
*H02K 3/30* (2006.01)
*C09D 7/61* (2018.01)
(Continued)

(52) U.S. Cl.
CPC ................ *H02K 3/30* (2013.01); *C09D 7/61* (2018.01); *C09D 163/00* (2013.01);
(Continued)

(58) Field of Classification Search
CPC .. H02K 3/12; H02K 3/28; H02K 3/48; H02K 3/345; H02K 3/34
See application file for complete search history.

(56) References Cited

FOREIGN PATENT DOCUMENTS

JP 2003-284277 A 10/2003
JP 2013127042 A * 6/2013
(Continued)

OTHER PUBLICATIONS

JP-2017163797-A machine translation Feb. 22, 2026.*
(Continued)

*Primary Examiner* — Leda T Pham
(74) *Attorney, Agent, or Firm* — Birch, Stewart, Kolasch & Birch, LLP

(57) ABSTRACT

A thermosetting resin composition used for forming a sealing member (65) in a state (4) that includes: a stator core (41) having a plurality of tooth parts (7) and a plurality of slots (8) formed in an alternating manner in a circumferential direction, a coil (9) wound around the slot (8) and accommodated in the slot (8), and having a pair of coil ends respectively protruding toward both sides in an axial direction from the stator core (41), and a sealing member (65) provided in the slot (8) by covering the coil (9), the thermosetting resin composition including an epoxy resin, a curing agent, and an inorganic filler and having a lowest melt viscosity of equal to or less than 40 Pa·s.

13 Claims, 3 Drawing Sheets

(51) Int. Cl.
*C09D 163/00* (2006.01)
*C09D 163/04* (2006.01)
*H02K 3/487* (2006.01)
*C08K 3/36* (2006.01)

(52) U.S. Cl.
CPC ........... *C09D 163/04* (2013.01); *H02K 3/487* (2013.01); *C08K 3/36* (2013.01)

(56) References Cited

FOREIGN PATENT DOCUMENTS

| | | | | |
|---|---|---|---|---|
| JP | 2017163797 | A | * | 9/2017 |
| JP | 2018-16669 | A | | 2/2018 |
| JP | 2018016669 | A | * | 2/2018 |
| JP | 2020-94092 | A | | 6/2020 |

OTHER PUBLICATIONS

JP-2018016669-A machine translation Feb. 22, 2026.*
JP-2013127042-A machine translation Feb. 22, 2026.*
International Search Report, issued in PCT/JP2022/041888, PCT/ISA/210, dated Jan. 31, 2023.
Written Opinion of the International Searching Authority, issued in PCT/JP2022/041888, PCT/ISA/237, dated Jan. 31, 2023.

* cited by examiner 100
1
1a
1b
1c
2
3
3a
4
5
6
9

THERMOSETTING RESIN COMPOSITION AND STATOR

TECHNICAL FIELD

The present invention relates to a thermosetting resin composition and a stator. More particularly, the present invention relates to a thermosetting resin composition for use as a sealing material of a stator core, and a stator including the thermosetting resin composition as a sealing material.

BACKGROUND ART

As a technology of using a resin material for a stator core, there is a technology described in Patent Document 1 (Japanese Unexamined Patent Publication No. 2003-284277). In this document, there is described a rotating electric machine having a stator in which a plurality of coils are wound at a predetermined interval on a stator core formed by laminating a plurality of electromagnetic steel sheets, a rotor held rotatably with respect to this stator, and a cooling frame fixing the stator, in which a high heat-conductive composite material with slots that are winding portions of a stator and are formed of a thermosetting resin having an anisotropic structure in the resin component, is disposed, and it is assumed that due to such a configuration, a rotating electric machine that easily transfers heat generated in the coils and has satisfactory heat dissipation properties is provided.

RELATED DOCUMENT

Patent Document

[Patent Document 1] Japanese Unexamined Patent Publication No. 2003-284277

SUMMARY OF THE INVENTION

Technical Problem

The inventors of the present invention conducted an investigation, and it was made clear that there is room for improvement in terms of a balance between workability at the time of filling a stator core with a resin material, and the filling properties of the resin material.

Solution to Problem

According to the present invention, there is provided a thermosetting resin composition including:

an epoxy resin;

a curing agent; and an inorganic filler, in which the thermosetting resin composition is used for forming a sealing member in a stator, the stator including a stator core having a plurality of tooth parts and a plurality of slots formed in an alternating manner in a circumferential direction, a coil wound around each of the slots and accommodated in each of the slots, and having a pair of coil ends respectively protruding toward both sides in an axial direction from the stator core, and a sealing member provided in each of the slots by covering the coils, and the thermosetting resin composition has a lowest melt viscosity of equal to or less than 40 Pa·s.

Advantageous Effects of Invention

According to the present invention, there is provided a thermosetting resin composition for use as a sealing material for a stator core, the thermosetting resin composition having workability at the time of filling a stator core with a resin material and filling properties of the resin material in a well-balanced manner.

DESCRIPTION OF EMBODIMENTS

Figure 1:
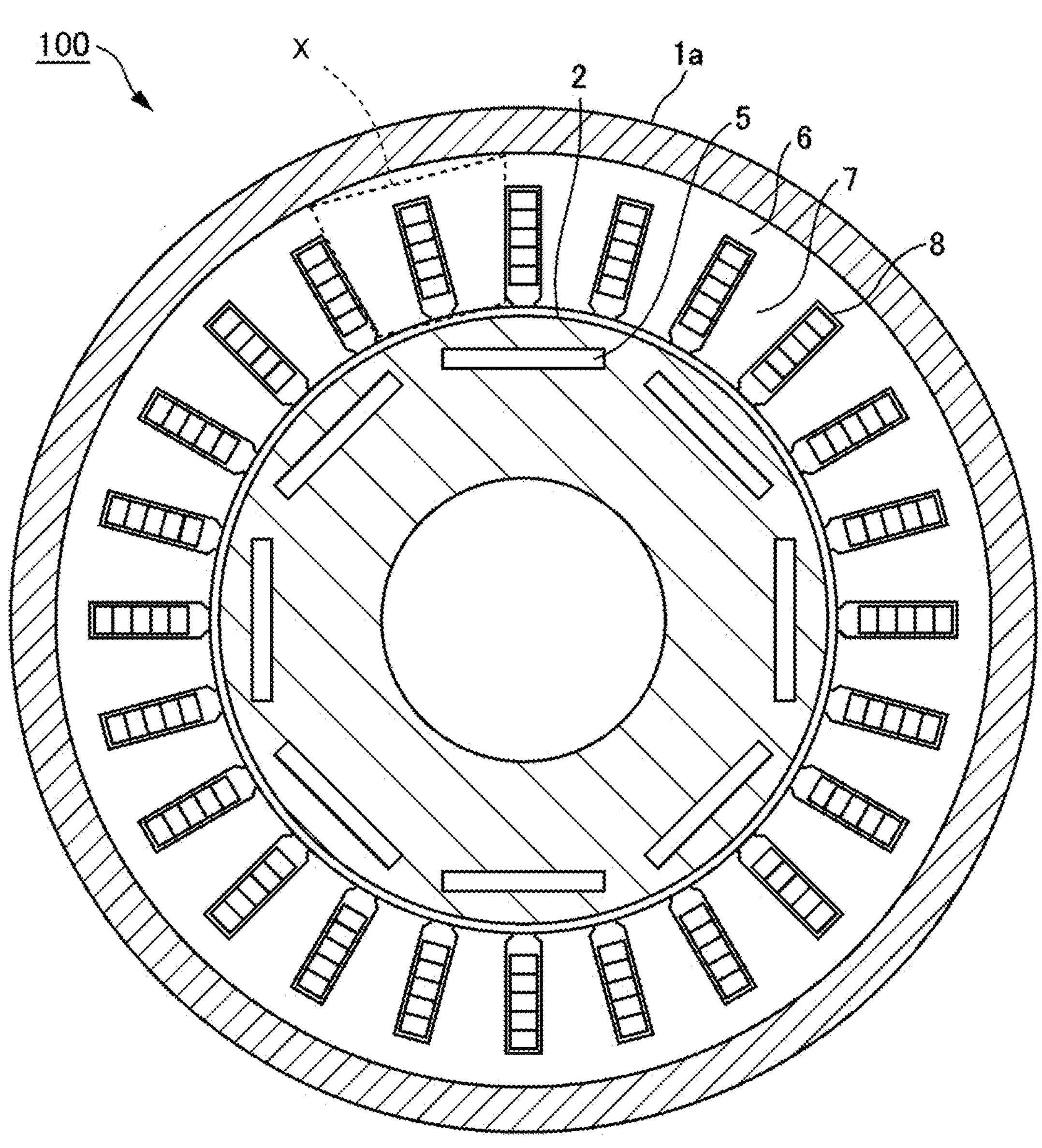
FIG. 1 is a cross-sectional view in a direction perpendicular to a rotating shaft direction of a motor.

Hereinafter, embodiments of the present invention will be described using the drawings. In all drawings, similar constituent elements will be assigned with similar reference numerals, and description thereof will not be repeated. In the present specification, the description "a to b" in a numerical value range indicates "equal to or greater than a and equal to or less than b".

[Thermosetting Resin Composition]

A thermosetting resin composition of the present embodiment is used for forming a sealing member in a stator that includes a stator core having a plurality of tooth parts and a plurality of slots formed in an alternating manner in a circumferential direction, a coil wound around each of the slots, accommodated in each of the slots, and having a pair of coil ends respectively protruding toward both sides in the axial direction from the stator core, and a sealing member provided in each of the slots by covering the coil. A method of using the thermosetting resin composition of the present embodiment as a sealing material will be described in detail below.

The thermosetting resin composition of the present embodiment includes an epoxy resin, a curing agent, and an inorganic filler. In addition, the thermosetting resin composition of the present embodiment having the above-described composition has a lowest melt viscosity of equal to or less than 40 Pa·s. As the thermosetting resin composition of the present embodiment has a reduced lowest melt viscosity, the thermosetting resin composition has satisfactory filling properties into the stator core and has sufficient fluidity for ensuring workability in a sealing step.

Hereinafter, components used in the thermosetting resin composition (in the present specification, may be simply referred to as "resin composition") according to the present embodiment will be described.

(Epoxy Resin)

Examples of the epoxy resin used for the thermosetting resin composition of the present embodiment include bifunctional or crystalline epoxy resins such as a biphenyl-type epoxy resin, a bisphenol A-type epoxy resin, a bisphenol F-type epoxy resin, a stilbene-type epoxy resin, and a hydroquinone-type epoxy resin; novolac-type epoxy resins such as a cresol novolac-type epoxy resin, a phenol novolac-type epoxy resin, and a naphthol novolac-type epoxy resin; phenol aralkyl-type epoxy resins such as a phenylene skeleton-containing phenol aralkyl-type epoxy resin, a biphenylene skeleton-containing phenol aralkyl-type epoxy resin, and a phenylene skeleton-containing naphthol aralkyl-type epoxy resin; trifunctional-type epoxy resins such as a triphenolmethane-type epoxy resin and an alkyl-modified triphenolmethane-type epoxy resin; modified phenol-type epoxy resins such as a dicyclopentadiene-modified phenol-type epoxy resin and a terpene-modified phenol-type epoxy resin; and heterocycle-containing epoxy resins such as a triazine nucleus-containing epoxy resin. These may be used singly, or two or more kinds thereof may be used in combination.

From the viewpoint of ensuring the fluidity of the obtained resin composition and the strength of a cured product of the resin composition, the epoxy resin preferably includes one or two or more epoxy resins selected from the group consisting of a phenol novolac-type epoxy resin and a phenol aralkyl-type epoxy resin, and more preferably includes a cresol novolac-type epoxy resin.

From the viewpoint of improving fluidity of the obtained resin composition and improving workability and moldability, the content of the epoxy resin in the resin composition may be, for example, equal to or more than 3% by mass with respect to the total solid content of the resin composition, and the content is preferably equal to or more than 8% by mass, more preferably equal to or more than 10% by mass, and even more preferably equal to or more than 12% by mass.

In addition, from the viewpoint of improving strength and heat resistance of a cured product formed by using the resin composition, the content of the epoxy resin is preferably equal to or less than 30% by mass, and more preferably equal to or less than 20% by mass, with respect to the total solid content of the resin composition.

In the present embodiment, the total solid content of the resin composition refers to a non-volatile-matter content in the resin composition, and refers to the remainder resulting from the removal of volatile components such as water and a solvent. In the present embodiment, the content with respect to the total amount of the resin composition refers to, in a case where a solvent is included, a content with respect to the total solid content resulting from the removal of a solvent in the resin composition.

In one embodiment, the resin composition may further include a thermosetting resin other than the above-described epoxy resin. Examples of a thermosetting resin that can be used include a bismaleimide resin, a benzoxazine resin, a phenol resin, a urea (urea) resin, a melamine resin, an unsaturated polyester resin, a polyurethane resin, a diallyl phthalate resin, a silicone resin, a cyanate resin, a polyimide resin, a polyamideimide resin, and a benzocyclobutene resin. Regarding these thermosetting resins, one kind thereof may be used singly, or two or more kinds thereof may be used in combination.

(Curing Agent)

The curing agent used for the thermosetting resin composition of the present embodiment is not limited as long as the curing agent is generally used for resin compositions including epoxy resins, and examples thereof include a phenol resin-based curing agent, an amine-based curing agent, an acid anhydride-based curing agent, a mercaptan-based curing agent, and other curing agents. Among these, a phenol resin-based curing agent is preferable in terms of the balance between flame resistance, moisture resistance, electrical characteristics, curability, storage stability, and the like.

The phenol resin-based curing agent may be, for example, any phenol resin-based curing agent that is generally used for epoxy resin compositions, and more specific examples include novolac resins, such as a phenol novolac resin and a cresol novolac resin, which are obtained by condensing or co-condensing phenols such as phenol, cresol, resorcin, catechol, bisphenol A, bisphenol F, phenylphenol, aminophenol, α-naphthol, β-naphthol, and dihydroxynaphthalene, with formaldehyde or ketones in the presence of an acidic catalyst; phenol aralkyl resins having a phenylene skeleton synthesized from the above-described phenols and dimethoxyparaxylene or bis(methoxymethyl)biphenyl; phenol aralkyl resins having a biphenylene skeleton; and phenol resins having a triphenylmethane skeleton. These may be used singly, or two or more kinds thereof may be used in combination. The phenol resin-based curing agent preferably includes a phenol novolac resin.

In a case where the curing agent is a phenol resin-based curing agent, from the viewpoint of improving the moldability and reliability of the resin composition, the equivalent ratio of the epoxy resin and the curing agent, that is, the ratio of (number of moles of epoxy groups in the epoxy resin/number of moles of phenolic hydroxyl groups in the phenol resin-based curing agent) is preferably equal to or more than 0.5, more preferably equal to or more than 0.6, and even more preferably equal to or more than 0.8. From a similar viewpoint, the above-described ratio is preferably equal to or less than 2, more preferably equal to or less than 1.8, and even more preferably equal to or less than 1.5.

Examples of the amine-based curing agent include aliphatic polyamines such as diethylenetriamine (DETA), triethylenetetramine (TETA), and metaxylylene diamine (MXDA); aromatic polyamines such as diaminodiphenylmethane (DDM), m-phenylenediamine (MPDA), and diaminodiphenylsulfone (DDS); and polyamine compounds such as dicyandiamide (DICY) and an organic acid dihydrazide. These may be used singly, or two or more kinds thereof may be used in combination.

Examples of the acid anhydride-based curing agent include alicyclic acid anhydrides such as hexahydrophthalic anhydride (HHPA), methyltetrahydrophthalic anhydride (MTHPA), and maleic anhydride; and aromatic acid anhydrides such as trimellitic anhydride (TMA), pyromellitic anhydride (PMDA), benzophenonetetracarboxylic acid (BTDA), and phthalic anhydride. These may be used singly, or two or more kinds thereof may be used in combination.

Examples of the mercaptan-based curing agent include trimethylolpropane tris(3-mercaptobutyrate) and trimethylolethane tris(3-mercaptobutyrate). These may be used singly, or two or more kinds thereof may be used in combination.

Examples of other curing agents include isocyanate compounds such as an isocyanate prepolymer and a blocked isocyanate; and organic acids such as a carboxylic acid-containing polyester resin. Regarding the curing agent, two or more kinds of curing agents of different systems among those described above may be used in combination.

From the viewpoint of achieving excellent fluidity in the sealing step and promoting improvement in the filling properties and moldability, the content of the curing agent in the resin composition is preferably equal to or more than 0.5% by mass, more preferably equal to or more than 1% by mass, and even more preferably equal to or more than 3% by mass, with respect to the total amount of the resin composition.

Meanwhile, from the viewpoint of improving moisture-resistant reliability and heat resistance of the cured resin product, the content of the curing agent is preferably equal to or less than 20% by mass, more preferably equal to or less than 15% by mass, even more preferably equal to or less than 10% by mass, and still more preferably equal to or less than 5% by mass, with respect to the total amount of the resin composition.

(Inorganic Filler)

Examples of the inorganic filler include silica, including fused silica such as crushed fused silica and fused spherical silica, and crystalline silica; alumina, aluminum hydroxide, silicon nitride, and aluminum nitride. These may be used singly, or two or more kinds thereof may be used in combination. From the viewpoint of making the mechanical characteristics or thermal characteristics of a cured product of the resin composition more preferable, it is preferable that the inorganic filler includes silica, and it is more preferable that the inorganic filler includes one or more kinds selected from the group consisting of crushed silica and fused spherical silica.

From the viewpoint of enhancing the fluidity of the resin composition and improving moldability, the average particle size d50 of the inorganic filler is preferably equal to or more than 0.01 μm, more preferably equal to or more than 1 μm, and even more preferably equal to or more than 5 μm. In addition, from the viewpoint of improving the filling properties and suppressing the occurrence of unfilling, the average particle size d50 of the inorganic filler is preferably equal to or less than 50 μm, and more preferably equal to or less than 40 μm.

Furthermore, as the inorganic filler, two or more kinds of fillers having different average particle sizes d50 may be used in combination. As a result, the filling properties of the inorganic filler with respect to the total solid content of the resin composition can be enhanced more effectively. For example, from the viewpoint of improving the filling properties of the resin composition, it is preferable that the inorganic filler includes a first filler having an average particle size of equal to or more than 1 μm and equal to or less than 12 μm and a second filler having an average particle size of more than 12 μm and equal to or less than 30 μm. From a similar viewpoint, the inorganic filler may include, for example, a first filler having an average particle size of equal to or more than 0.01 μm and equal to or less than 1 μm and a second filler having an average particle size of more than 1 μm and equal to or less than 50 μm.

Furthermore, the value of (d50/d90) calculated from the value of a particle size d90 of an inorganic filler having a cumulative frequency of 90% as measured using a laser diffraction-type particle size distribution analyzer and the value of an average particle size d50 of the inorganic filler, is preferably equal to or more than 0.2, more preferably equal to or more than 0.25, and even more preferably equal to or more than 0.3, from the viewpoint of improving the fluidity of the resin composition. In addition, from the viewpoint of improving the narrow part filling properties, the above-described ratio (d50/d90) is preferably equal to or less than 1.0, more preferably equal to or less than 0.9, and even more preferably equal to or less than 0.8.

Here, the particle size, specifically d50 and d90, of the inorganic filler can be obtained by measuring the particle size distribution of particles on a volume basis by using a commercially available laser diffraction-type particle size distribution analyzer (for example, manufactured by Shimadzu Corporation, SALD-7000).

From the viewpoint of suppressing the hygroscopic properties and thermal expansion properties of the resin composition and more effectively improving the temperature cycle resistance and moisture resistance of a cured product of the resin composition, the content of the inorganic filler in the resin composition is preferably equal to or more than 50% by mass, more preferably equal to or more than 65% by mass, and even more preferably equal to or more than 80% by mass, with respect to the total amount of the resin composition. In addition, from the viewpoint of more effectively improving the fluidity and filling properties during molding of the resin composition, the content of the inorganic filler is preferably equal to or less than 95% by mass, and more preferably equal to or less than 93% by mass, with respect to the total amount of the resin composition.

In addition, when the inorganic filler includes silica, from the viewpoint of suppressing the hygroscopic properties and thermal expansion properties of the resin composition and more effectively improving the temperature cycle resistance and moisture resistance of a cured product of the resin composition, the content of silica in the resin composition is preferably equal to or more than 50% by mass, more preferably equal to or more than 65% by mass, and even more preferably 80% by mass or more, with respect to the total amount of the resin composition.

From the viewpoint of more effectively improving the fluidity and filling properties during molding of the resin composition, the content of silica in the resin composition is preferably equal to or less than 95% by mass, and more preferably equal to or less than 93% by mass.

(Other Components)

In the present embodiment, the resin composition may further include components other than the above-mentioned components. For example, the resin composition may further include a curing accelerator, a coupling agent, a flame retardant, an ion scavenger, a coloring agent, and an antioxidant.

(Curing Accelerator)

The curing accelerator may be any curing accelerator that accelerates a crosslinking reaction between an epoxy resin and a curing agent, and curing accelerators that are used for general epoxy resin compositions can be used.

Specific examples of the curing accelerator include diazabicycloalkenes such as 1,8-diazabicyclo(5,4,0)undecene-7, and derivatives thereof; organic phosphines such as triphenylphosphine and methyldiphenylphosphine; imidazole compounds (imidazole-based curing accelerators) such as 2-methylimidazole; and tetra-substituted phosphonium-tetra-substituted borates such as tetraphenylphosphonium-tetraphenylborate.

Examples of the imidazole-based curing accelerator include imidazole, 2-methylimidazole, 2-undecylimidazole, 2-heptadecylimidazole, 1,2-dimethylimidazole, 2-ethyl-4-methylimidazole, 2-phenylimidazole, 2-phenyl-4-methylimidazole, 1-benzyl-2-phenylimidazole, 1-benzyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 1-cyanoethyl-2-undecylimidazolium trimellitate, 1-cyanoethyl-2-phenylimidazolium trimellitate, 2,4-diamino-6-[2'-methylimidazolyl(1')]-ethyl-s-triazine, 2,4-diamino-6-[2'-undecylimidazolyl(1')]-ethyl-s-triazine, 2,4-diamino-6-[2'-ethyl-4-methylimidazolyl(1')]-ethyl-s-triazine, isocyanuric acid adduct of 2,4-diamino-6-[2'-methylimidazolyl(1')]-ethyl-s-triazine, isocyanuric acid adduct of 2-phenylimidazole, isocyanuric acid adduct of 2-methylimidazole, 2-phenyl-4,5-dihydroxydimethylimidazole, and 2-phenyl-4-methyl-5-hydroxymethylimidazole.

(Coupling Agent)

As the coupling agent, for example, known coupling agents, including various silane-based compounds such as epoxysilane, mercaptosilane, aminosilane, alkylsilane, ureidosilane, vinylsilane, and methacrylsilane, titanium-based compounds, aluminum chelates, and aluminum/zirconium-based compounds, can be used. Examples of these include silane-based coupling agents such as vinyltrichlorosilane, vinyltrimethoxysilane, vinyltriethoxysilane, vinyltris(β-methoxyethoxy)silane, γ-methacryloxypropyltrimethoxysilane, β-(3,4-epoxycyclohexyl)ethyltrimethoxysilane, γ-glycidoxypropyltrimethoxysilane, γ-glycidoxypropyltriethoxysilane, γ-glycidoxypropylmethyldimethoxysilane, γ-methacryloxypropylmethyldiethoxysilane, γ-methacryloxypropyltriethoxysilane, vinyltriacetoxysilane, γ-mercaptopropyltrimethoxysilane, γ-aminopropyltriethoxysilane, γ-anilinopropyltrimethoxysilane, γ-anilinopropylmethyldimethoxysilane, γ-[bis(β-hydroxyethyl)]aminopropyltriethoxysilane, N-β-(aminoethyl)-γ-aminopropyltrimethoxysilane, N-β-(aminoethyl)-γ-aminopropyltriethoxysilane, N-β-(aminoethyl)-γ-aminopropylmethyldimethoxysilane, phenylaminopropyltrimethoxysilane, γ-(β-aminoethyl)aminopropyldimethoxymethylsilane, N-(trimethoxysilylpropyl)ethylenediamine, N-(dimethoxymethylsilylisopropyl)ethylenediamine, methyltrimethoxysilane, dimethyldimethoxysilane, methyltriethoxysilane, N-β-(N-vinylbenzylaminoethyl)-γ-aminopropyltrimethoxysilane, γ-chloropropyltrimethoxysilane, hexamethyldisilane, vinyltrimethoxysilane, γ-mercaptopropylmethyldimethoxysilane, 3-isocyanatopropyltriethoxysilane, 3-acryloxypropyltrimethoxysilane, and hydrolysate of 3-triethoxysilyl-N-(1,3-dimethylbutylidene)propylamine; and titanate-based coupling agents such as isopropyltriisostearoyl titanate, isopropyl tris(dioctyl pyrophosphate) titanate, isopropyl tri(N-aminoethyl-aminoethyl) titanate, tetraoctyl bis(ditridecyl phosphite) titanate, tetra(2,2-diallyloxymethyl-1-butyl) bis(ditridecyl) phosphite titanate, bis(dioctyl pyrophosphate) oxyacetate titanate, bis(dioctyl pyrophosphate) ethylene titanate, isopropyl trioctanoyl titanate, isopropyl dimethacryl isostearoyl titanate, isopropyl tridodecylbenzenesulfonyl titanate, isopropyl isostearoyl diacryl titanate, isopropyl tri(dioctyl phosphate) titanate, isopropyl tricumylphenyl titanate, and tetraisopropyl bis(dioctyl phosphite) titanate. These may be used singly, or two or more kinds thereof may be used in combination. Among these, a silane-based compound such as epoxysilane, mercaptosilane, aminosilane, alkylsilane, ureidosilane, or vinylsilane is more preferable. Furthermore, from the viewpoint of more effectively improving the filling properties and moldability, it is even more preferable to use a secondary aminosilane represented by phenylaminopropyltrimethoxysilane.

In a case where a coupling agent is used, the content thereof is preferably equal to or more than 0.05%, by mass, and more preferably equal to or more than 0.10% by mass, with respect to the total solid content of the resin composition, from the viewpoint of making the fluidity of the resin composition more preferable. In addition, from the viewpoint of improving the mechanical strength of a cured product of the resin composition, the content of the coupling agent is preferably equal to or less than 1.5% by mass, more preferably equal to or less than 1.0% by mass, and even more preferably equal to or less than 0.5% by mass, with respect to the total solid content of the resin composition.

(Coloring Agent)

Examples of the coloring agent include carbon black, red iron oxide, and titanium oxide. Among these, carbon black is preferably used as the coloring agent.

From the viewpoint of allowing the cured product of the resin composition to have a preferable external appearance, the content of the coloring agent is preferably equal to or more than 0.05% by mass, and more preferably equal to or more than 0.10% by mass, with respect to the total amount of the resin composition. In addition, from the viewpoint of making the resin viscosity more preferable, the content of the coloring agent is preferably equal to or less than 1.5% by mass, more preferably equal to or less than 1.0% by mass, and even more preferably equal to or less than 0.5% by mass, with respect to the total amount of the resin composition.

(Antioxidant)

Examples of the antioxidant include a hindered phenol-based compound, a hindered amine-based compound, and a thioether-based compound.

(Characteristics of Thermosetting Resin Composition or Cured Product Thereof)

Next, the characteristics of the thermosetting resin composition of the present embodiment or a cured product thereof will be described.

The thermosetting resin composition of the present embodiment including the above-described components has a lowest melt viscosity of equal to or less than 40 Pa·s, and preferably equal to or less than 35 Pa·s. The lower limit value of the lowest melt viscosity of the resin composition is not particularly limited; however, the lowest melt viscosity is, for example, equal to or more than 5 Pa·s.

The resin composition of the present embodiment has a lowest melt viscosity in the above-described range, and as a result, the resin composition has satisfactory filling properties for a stator core and has satisfactory workability in a sealing step.

Regarding the resin composition of the present embodiment, when a torque value is measured over time by using a Labo Plastomill under the conditions of a rotation speed of 30 rpm and a measurement temperature of 175° C., a time $T_1$ at which the torque value is equal to or less than twice the minimum torque value is equal to or more than 40 seconds and equal to or less than 90 seconds, and the minimum torque value is equal to or less than 0.8 N·m.

A flexural modulus of a cured product of the resin composition measured at 25° C. is equal to or more than 10 GPa, and more preferably equal to or more than 12 GPa, from the viewpoint of increasing the strength of the cured product. In addition, from the viewpoint of making the stress relaxation characteristics of the cured product more preferable, the flexural modulus measured at 25° C. is equal to or less than 30 GPa, and more preferably equal to or less than 25 GPa.

The flexural modulus of the cured product of the resin composition is measured according to, for example, JIS K 7171.

A gelling time of the resin composition of the present embodiment is preferably equal to or more than 40 seconds, and more preferably equal to or more than 50 seconds, from the viewpoint of accelerating the molding cycle while promoting improvement in the moldability of the resin composition. Furthermore, from the viewpoint of realizing a cured product having excellent curability, the gelling time of the resin composition is preferably equal to or less than 100 seconds, and more preferably equal to or less than 90 seconds.

Measurement of the gelling time can be performed by melting the resin composition over a hot plate heated to 175° C., and then measuring the time taken by the resin composition to become tack-free (gelling time) while kneading with a spatula.

With regard to the resin composition of the present embodiment, a thermal conductivity of a cured product thereof is, for example, equal to or more than 0.7 W/m·K, preferably equal to or more than 2 W/m·K, and more preferably equal to or more than 3 W/m·K.

[Method of Manufacturing Thermosetting Resin Composition]

The resin composition of the present embodiment can be manufactured by uniformly mixing the above-described components and additives that are used as needed, so as to obtain predetermined contents, by using a mixer such as a tumbler mixer or a Henschel mixer, a blender, or the like, and then kneading the mixture while heating with a kneader, a roll, a Disper, an Agi Homo Mixer, a planetary mixer, and the like. The temperature during kneading needs to be in a temperature range in which no curing reaction occurs, and although the temperature may vary depending on the composition of the epoxy resin and the curing agent, it is preferable to perform melt-kneading at about 70° C. to 150° C. After kneading, the mixture may be cooled and solidified, and the kneaded product may be processed into a powdered form, a granular form, a tablet form, or a sheet form.

Regarding a method of obtaining a powdered resin composition, for example, a method of pulverizing the kneaded product by using a pulverizing apparatus may be mentioned. The kneaded product that has been molded into a sheet may be pulverized. As the pulverizing apparatus, for example, a hammer mill, a stone mill-type grinding mill, or a roll crusher can be used.

As a method of obtaining a granular or powdered resin composition, for example, a granulation method represented by a hot cut method of installing a die having a small diameter at an output of a kneading device and cutting a kneaded product in a molten state that is discharged through the die into a predetermined length with a cutter or the like, may be used. In this case, after obtaining a granular or powdered resin composition by a granulation method such as the hot-cut method, it is preferable to perform degassing before the temperature of the resin composition does not decrease excessively.

[Use Application]

The sealing resin composition of the present embodiment is used as a material for forming the above-described sealing member for a stator that includes a stator core having a plurality of tooth parts and a plurality of slots formed in an alternating manner in a circumferential direction, coils each wound around a slot and accommodated in the slot, and a sealing member provided by covering the coils in the slots. A stator provided with the sealing resin composition of the present embodiment as a sealing material is applied to, for example, an electric motor (motor) as a rotating electric machine (an electric motor, a generator, or a dual-use machine of electric motor/generator).

The use application of a motor will be described below as an embodiment.

Figure 2:
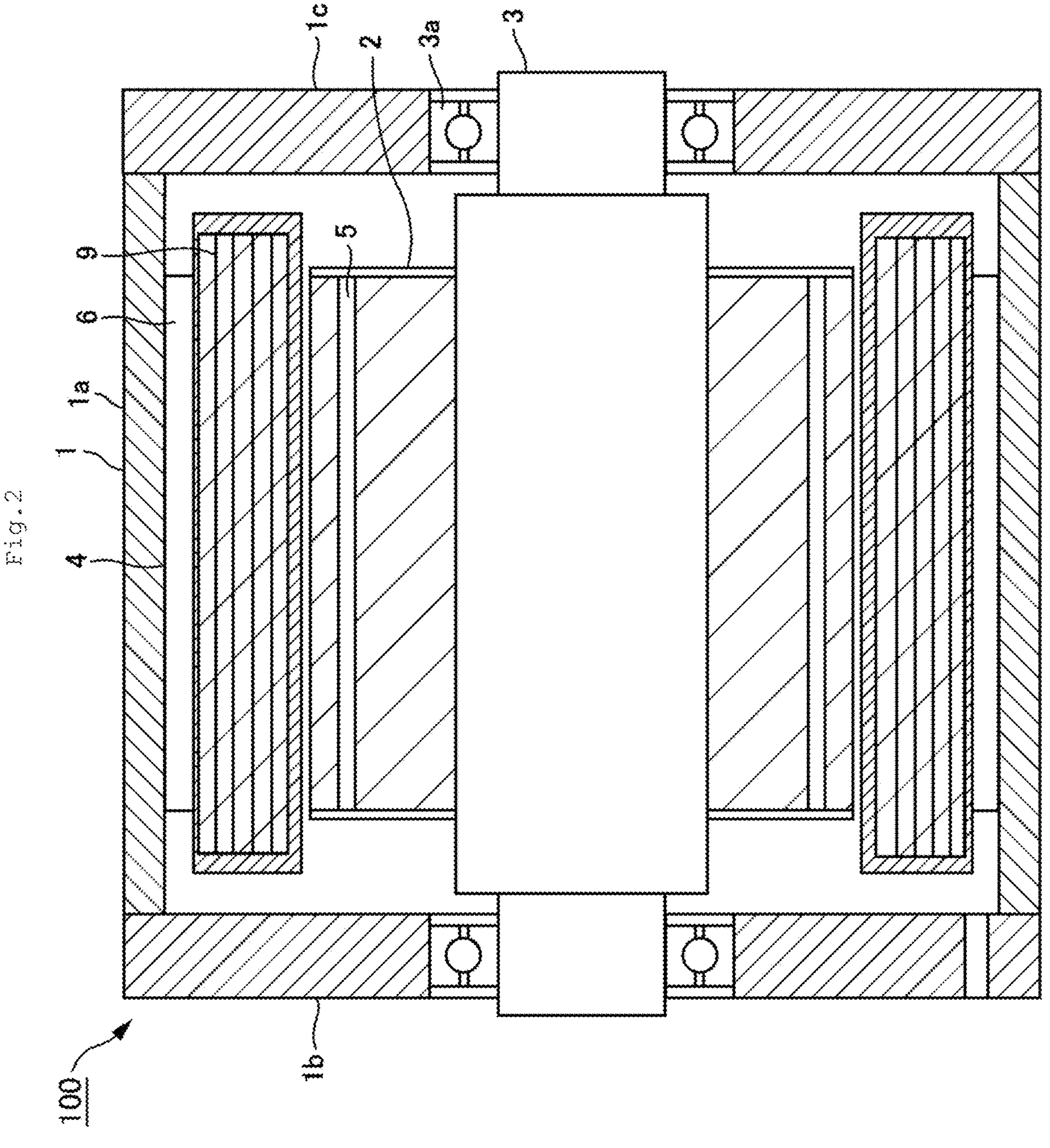
FIG. 2 is a vertical cross-sectional view in the rotating shaft direction of the motor.
Figure 3:
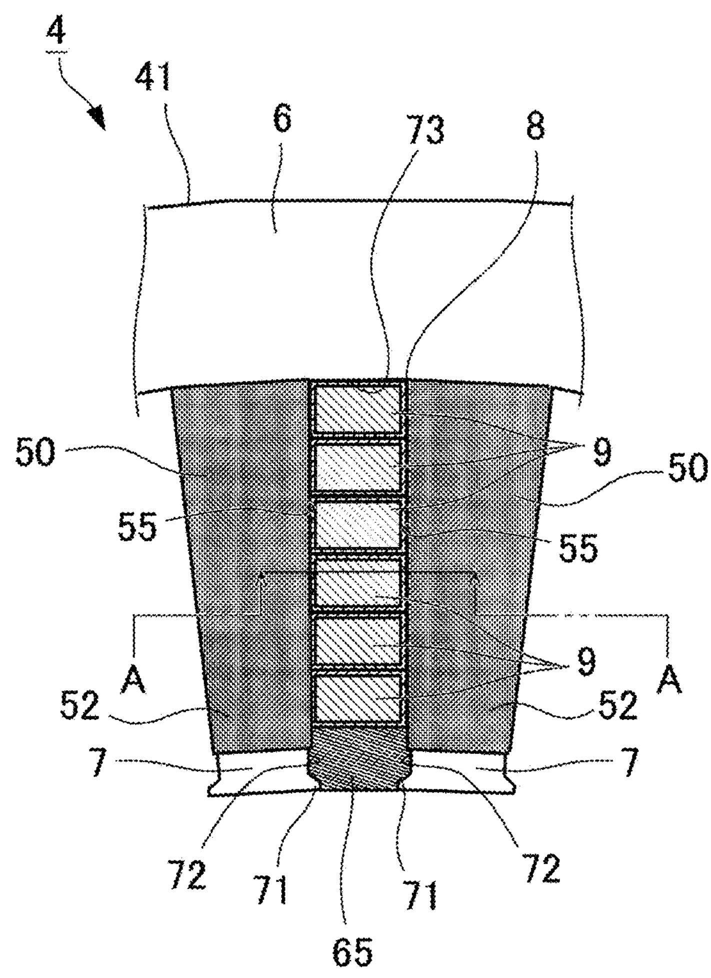
FIG. 3 is an enlarged view of the periphery of a slot.

FIG. 1 schematically shows a cross-sectional view of a motor 100 in a direction perpendicular to a rotating shaft direction. FIG. 2 schematically shows a cross-sectional view of the motor 100 in the rotating shaft direction. FIG. 3 is an enlarged view showing the periphery of a slot (area X in FIG. 1) and schematically shows a cross-sectional view of a portion where a coil 9 protrudes from an end part of a slot 8.

<Basic Structure of Motor 100>

A motor 100 includes a case 1, as well as a rotor 2, a stator 4, and a coil 9 accommodated in the case 1.

<Case 1>

The case 1 includes a cylindrical part 1*a* and side plate parts 1*b* and 1*c* that close two ends in an axial direction of the cylindrical part 1*a*. As a material of the case 1, for example, an aluminum alloy (casting product), a resin material, or a combination thereof can be used.

<Rotor 2>

As shown in FIG. 1, the rotor 2 is accommodated inside the case 1. As shown in FIG. 2, a rotating shaft 3 is attached to a center of the rotor 2 as an output shaft. Both ends of the rotating shaft 3 are supported by the side plate parts 1*b* and 1*c* through bearings 3*a*. Accordingly, the rotor 2 is freely rotatable around the rotating shaft 3.

Permanent magnets 5 are internally mounted in the rotor 2. Specifically, as shown in FIG. 1, a plurality of (here, eight) permanent magnets 5 are placed on the same circumference at equal intervals. In this case, the permanent magnets 5 are installed such that the magnetic poles of adjacent permanent magnets are different from each other.

As shown in FIG. 2, a cylindrical-shaped stator 4 is disposed and fixed on the inner peripheral side of the cylindrical part 1*a* so as to surround the outer periphery of the rotor 2. A minute gap (air gap) is provided between the inner peripheral surface of the stator 4 and the outer peripheral surface of the rotor 2.

<Stator Core 41>

A stator core 41 is provided by laminating and tightly fixing a plurality of electromagnetic steel sheets in the axial direction, and is provided with a yoke part 6 that is provided annularly when viewed from an end part in the axial direction as shown in FIG. 1, and with a plurality of tooth parts 7 extending from the yoke part 6 toward the rotor 2 side (inner peripheral side). The plurality of tooth parts 7 are provided by being arranged at equal intervals in the circumferential direction. Here, as shown in FIG. 1, twenty-four tooth parts 7 are provided. A slot 8 is provided between each of the tooth parts 7. In addition, the tooth parts 7 are provided with a resin layer 50 that covers the tooth parts 7 in a small thickness by causing a resin composition to circle around the tooth parts 7.

<Coil 9>

The coil 9 has a rectangular U-shape and is wound so as to be housed in two slots 8 spaced across a tooth part 7. Here, the coil 9 is accommodated in a liner member 20 disposed in the slots 8 by distributed winding (FIG. 1). The coil 9 has a first coil end and a second coil end. The first coil end protrudes to one side in the axial direction of the stator core 41. The second coil end protrudes to the other side in the axial direction of the stator core 41. That is, the coil 9 has a pair of coil ends that respectively protrude toward both sides in the axial direction of the stator core 41.

<Tooth Part 7>

The tooth parts 7 are provided correspondingly to the permanent magnets 5 of the rotor 2 described above, and by sequentially exciting the coils 9, the rotor 2 rotates due to attraction and repulsion with the permanent magnets 5 in correspondence with this sequential exciting.

The tooth part 7 has a large width in the circumferential direction on the outer peripheral side and has a small width on the inner peripheral side. The tooth part is tapered toward the inner peripheral side. At the end part on the inner peripheral side of the tooth part 7, tooth part tips 71 are formed to face each other in the circumferential direction so as to reduce the width of the slot 8.

<Slot 8>

The slot 8 is a space between adjacent tooth parts 7 and is provided such that wall surfaces 72 of the tooth part 7 facing each other in the radial direction are parallel surfaces, as shown in FIG. 3. A space between the tooth part tips 71 forms an opening on the inner peripheral side of the slot 8. The slot 8 is provided with a plurality of coils 9 arranged on the outer peripheral side (on the side of the yoke part 6) and with a resin sealing part 65 provided on the inner peripheral side (on the side of the tooth part tip 71).

<Resin Sealing Part 65>

As shown in FIG. 3, the resin sealing part 65 is provided on the inner peripheral side of the slot 8 (on the side of the tooth part tip 71). The resin sealing part 65 may be provided by insert molding or may be provided as a separate component. Regarding the resin material used for the resin sealing part 65, the above-mentioned sealing resin composition of the present embodiment is used.

In one embodiment, the resin sealing part 65 is provided only within the slot 8 so as to cover the coil 9.

In another embodiment, the resin sealing part 65 is provided so as to cover the coil 9 in the slot 8 and at the same time, to cover one coil end of a pair of coil ends. In other words, the resin sealing part 65 is provided to cover any one of the first and second coil ends.

In still another embodiment, the resin sealing part 65 is provided so as to cover the coil 9 in the slot 8 and at the same time, to cover both of the pair of coil ends. In other words, the resin sealing part 65 is provided so as to cover both the first and second coil ends.

<Method of Manufacturing Stator 4>

A method of manufacturing the stator 4 of the present embodiment will be described.

First, a stator 4 is prepared by laminating and tightly fixing a plurality of electromagnetic steel sheets in the axial direction (stator preparation step).

Then, a resin layer 50 is formed to cover the periphery (wall surfaces 73, upper surface 75*a*, and lower surface 75*b*) of tooth parts 7 by insert molding, by allowing an insulating resin composition to integrally circle around the tooth parts 7 (resin layer formation step).

Next, coils 9 are placed in slots 8 where the resin layer 50 is provided (coil placement step).

After all the coils 9 are accommodated, a resin sealing part 65 is obtained by filling regions on the inner peripheral side of the slots 8 with the resin composition of the present embodiment, and performing insert molding (resin filling step).

Through the above-described steps, the stator 4 shown in FIG. 3 is obtained.

Thus, the embodiments of the present invention have been described above; however, these are only examples of the present invention, and various configurations other than the above-described ones can be employed.

EXAMPLES

Hereinafter, the present invention will be described in detail with reference to Examples; however, the present invention is not intended to be limited to the description of these Examples.

The raw material components used in each of Examples and each of Comparative Examples will be shown below.

(Epoxy Resin)

Epoxy resin 1: Orthocresol novolac-type epoxy resin (manufactured by DIC Corporation, product name "EPICRON N-670")

Epoxy resin 2: Orthocresol novolac-type epoxy resin (manufactured by DIC Corporation, product name "EPICRON N-660")

Epoxy resin 3: Biphenyl-type epoxy resin (manufactured by Mitsubishi Chemical Corporation, YX-4000K)

(Curing Agent)

Curing agent 1: Novolac-type phenol compound (manufactured by Sumitomo Bakelite Co., Ltd., PR-51470)

Curing agent 2: Novolac-type phenol compound (manufactured by Sumitomo Bakelite Co., Ltd., PR-51714)

Curing agent 3: Triphenolmethane-type phenol resin, (manufactured by Meiwa Plastic Industries, Ltd., MEH-7500)

(Inorganic Filler)

Inorganic filler 1: Fused spherical silica (manufactured by Denka Co., Ltd., FB-950)

Inorganic filler 2: Fused spherical silica (manufactured by Denka Co., Ltd., FB-105)

Inorganic filler 3: Crushed fused silica (manufactured by Fumitech Co., Ltd., FMT-15C)

Inorganic filler 4: Glass fiber (manufactured by Nitto Boseki Co., Ltd., CS3E479)

Inorganic filler 5: Crushed crystalline silica (manufactured by Tatsumori, Ltd., HFC-7)

Inorganic filler 6: Fused spherical alumina (manufactured by Denka Co., Ltd., DAB-45SI)

(Curing Accelerator)

Curing accelerator 1: Tetraphenylphosphonium 2,3-dihydroxynaphthalate

Curing accelerator 2: 2-Phenyl-4,5-dihydroxymethylimidazole (manufactured by Shikoku Chemicals Corporation, 2PHZ-PW)

(Mold Release Agent)

Wax 1: Carnauba wax (manufactured by Toa Kasei Co., Ltd., TOWAX-132)

(Silane Coupling Agent)

Silane coupling agent 1: N-phenyl-3-aminopropyltrimethoxysilane (Dow Corning Toray Co., Ltd., CF-4083)

(Coloring Agent)

Coloring agent 1: Carbon black (Mitsubishi Chemical Corporation, CARBON #5)

(Preparation of Resin Composition)

First, each raw material blended according to Table 1 was mixed at normal temperature using a mixer, and then the mixture was roll-kneaded at a temperature equal to or higher than 70° C. and equal to or lower than 110° C. Next, the obtained kneaded product was cooled, and then this was pulverized to obtain a resin composition.

The following measurements were made on the resin composition obtained in each example. The measurement results are shown together in Table 1.

(Spiral Flow of Resin Composition Immediately after Manufacturing)

Spiral flow measurement was performed on the sealing resin composition obtained in each example. The spiral flow measurement was performed by injecting the sealing resin composition into a mold for spiral flow measurement according to EMMI-1-66 by using a low-pressure transfer molding machine (manufactured by Kohtaki Corporation, "KTS-15") under the conditions of a mold temperature of 175° C., an injection pressure of 6.9 MPa, and a curing time of 120 seconds, and measuring the flow length (cm). The spiral flow is an index of fluidity, and a larger numerical value indicates more favorable fluidity.

(Gelling Time)

The gelling time of the sealing resin composition obtained in each example was measured. Measurement of the gelling time was performed by melting the sealing resin composition over a hot plate heated to 175° C. and then measuring the time taken by the sealing resin composition to cure (gelling time: seconds) while kneading with a spatula.

(Glass Transition Temperature and Coefficient of Linear Expansion (α1))

For each example, the glass transition temperature of a cured product of the obtained resin composition was measured as follows. First, the sealing resin composition was injection-molded using a transfer molding machine at a mold temperature of 175° C. and an injection pressure of 9.8 MPa for a curing time of 3 minutes, and a test piece having a size of 15 mm×4 mm×4 mm was obtained. Next, the obtained test piece was post-cured at 175° C. for 4 hours, and then measurement was performed using a thermomechanical analyzer (manufactured by Seiko Instruments, Inc., TMA100) under the conditions of a measurement temperature range of 40° C. to 300° C. and a rate of temperature increase of 5° C./min. From these measurement results, the glass transition temperature and the coefficient of linear expansion (α1) in the measurement temperature range of 40° C. to 80° C. were calculated.

(Flexural Modulus)

After the resin composition was transfer-molded at 175° C./3 minutes, the resin composition was further cured at 175° C./4 hours, and then the flexural modulus at 25° C. was measured according to JIS K 7171.

(Bending Strength)

A cured product was created in the same manner as in the above-described measurement of the flexural modulus, and the bending strength at 25° C. was measured according to JIS K 7171.

(Thermal Conductivity)

For the resin composition obtained in each example, the sealing resin composition was injection-molded using a transfer molding machine at a mold temperature of 175° C. and an injection pressure of 9.8 MPa for a curing time of 3 minutes, and a cured body having a size of 10 mm×10 mm×1 mm was obtained.

The thermal conductivity of the obtained cured product was calculated using the following equation, from the thermal diffusion coefficient (α) measured by a laser flash method (half-time method), the specific heat (Cp) measured by a DSC method, and the density (ρ) measured according to JIS K 6911. The unit of the thermal conductivity is W/m·K.

$$\text{Thermal conductivity } [\text{W/m}\cdot\text{K}] = \alpha[\text{mm}^2/s] \times Cp[\text{J/kg}\cdot\text{K}] \times \rho[\text{g/cm}^3]$$

(Dielectric Breakdown Strength)

For the resin composition obtained in each example, the sealing resin composition was injection-molded using a transfer molding machine at a mold temperature of 175° C. and an injection pressure of 9.8 MPa for a curing time of 3 minutes, and a cured body having a size of 100 mmφ×2 mm was obtained.

The dielectric breakdown voltage of a cured product of the resin composition obtained as described above was measured as follows according to JIS K 6911. First, the obtained cured product was placed in insulating oil in a state of being sandwiched between circular electrodes. Next, an alternating current voltage was applied to both electrodes by using TOS9201 manufactured by Kikusui Electronics Corporation, such that the voltage increased at a voltage increase rate of 2.5 kV/sec. The voltage at which the test piece broke was designated as dielectric breakdown voltage. A larger value of the dielectric breakdown voltage indicates that the dielectric breakdown strength is more satisfactory.

(Curing Behavior Measurement)

For the obtained resin compositions, measurement of a minimum torque value and a time $T_1$ at which the torque value is equal to or less than twice the minimum torque value, was carried out as follows. First, melting torque of the resin composition was measured over time by using a Labo Plastomill tester (manufactured by Toyo Seiki Seisaku-sho, Ltd., 4C150) under the conditions of a rotation speed of 30 rpm and a measurement temperature of 175° C. Next, the time $T_1$ at which the torque value was equal to or less than twice the minimum torque value was calculated on the basis of the measurement results. The measurement start point was a point at which, after a material was charged into the Labo Plastomill tester and the torque suddenly increased, the torque started to decrease. The minimum torque value was calculated from the measurement results. The results are shown in Table 1. The unit of the time $T_1$ in Table 1 is seconds, and the unit of the minimum torque value is N·m.

TABLE 1

| | | Unit | Example 1 | Example 2 | Example 3 | Example 4 |
|---|---|---|---|---|---|---|
| <Composition of resin composition> | | | | | | |
| Epoxy resin | Epoxy resin 1 | % by mass | 12.10 | 13.60 | — | — |
| | Epoxy resin 2 | % by mass | — | — | 11.50 | — |
| | Epoxy resin 3 | % by mass | — | — | — | 5.50 |
| Curing agent | Curing agent 1 | % by mass | 5.25 | 5.90 | — | — |
| | Curing agent 2 | % by mass | — | — | 5.00 | — |
| | Curing agent 3 | % by mass | — | — | — | 2.50 |
| Inorganic filler | Inorganic filler 1 | % by mass | 46.85 | — | 10.00 | — |
| | Inorganic filler 2 | % by mass | 20.00 | — | — | 15.00 |
| | Inorganic filler 3 | % by mass | 15.00 | 64.20 | — | — |
| | Inorganic filler 4 | % by mass | — | 15.00 | — | — |
| | Inorganic filler 5 | % by mass | — | — | 72.80 | — |

TABLE 1-continued

| | | Unit | Example 1 | Example 2 | Example 3 | Example 4 |
|---|---|---|---|---|---|---|
| | Inorganic filler 6 | % by mass | — | — | — | 75.90 |
| Curing accelerator | Curing accelerator 1 | % by mass | 0.30 | — | 0.20 | 0.40 |
| | Curing accelerator 2 | % by mass | — | 0.60 | — | — |
| Wax | Wax 1 | % by mass | — | 0.40 | — | 0.20 |
| Other additives | Silane coupling agent 1 | % by mass | 0.20 | — | 0.20 | 0.20 |
| | Coloring agent 1 | % by mass | 0.30 | 0.30 | 0.30 | 0.30 |
| Total | | % by mass | 100.00 | 100.00 | 100.00 | 100.00 |
| <Characteristics of resin composition> | | | | | | |
| Lowest melt viscosity | | Pa · s | 20 | 35 | 25 | 15 |
| Spiral flow | | cm | 100 | 90 | 100 | 150 |
| Gelling time | | sec | 60 | 50 | 70 | 55 |
| Coefficient of linear expansion $\alpha 1$ | | ppm/° C. | 13 | 18 | 18 | 10 |
| Glass transition temperature Tg | | ° C. | 170 | 180 | 165 | 145 |
| Bending strength | | MPa | 165 | 140 | 165 | 180 |
| Flexural modulus | | GPa | 17.5 | 15.5 | 20.0 | 29.0 |
| Thermal conductivity | | W/m · K | 0.8 | 0.8 | 2 | 3 |
| Dielectric breakdown strength | | kV/mm | 22 | 20 | 21 | 15 |
| Curing behavior measurement | Minimum torque value | N · m | 0.4 | 0.7 | 0.5 | 0.1 |
| | Time $T_1$ | sec | 60 | 68 | 72 | 47 |

This application claims priority on the basis of Japanese Patent Application No. 2021-183829, filed Nov. 11, 2021, the disclosure of which is incorporated herein in its entirety by reference.

REFERENCE SIGNS LIST

100 motor
1 case
2 rotor
4 stator
5 permanent magnet
6 yoke part
7 tooth part
8 slot
9 coil
21 coil holding part
41 stator core
50 resin layer
51 inner surface resin layer
52 outer surface resin layer
55 resin layer surface
65 resin sealing part
71 tooth part tip
72 wall surface

The invention claimed is:

1. A thermosetting resin composition comprising:
an epoxy resin;
a curing agent; and
an inorganic filler,
wherein the thermosetting resin composition is used for forming a sealing member in a stator, the stator including
a stator core having a plurality of tooth parts and a plurality of slots formed in an alternating manner in a circumferential direction,
a coil wound around each of the slots and accommodated in each of the slots, and having a pair of coil ends respectively protruding toward both sides in an axial direction from the stator core, and
the sealing member provided in each of the slots by covering the coil, and
wherein the thermosetting resin composition has a lowest melt viscosity of equal to or more than 5 Pa·s and equal to or less than 40 Pa·s.

2. The thermosetting resin composition according to claim 1,
wherein when a torque value is measured over time with a Labo Plastomill under conditions of a rotation speed of 30 rpm and a measurement temperature of 175° C., a time $T_1$ at which the torque value is equal to or less than twice a minimum torque value is equal to or more than 40 seconds and equal to or less than 90 seconds, and the minimum torque value is equal to or less than 0.8 N·m.

3. The thermosetting resin composition according to claim 1,
wherein a flexural modulus at 25° C. of a cured product of the thermosetting resin composition is equal to or more than 10 GPa and equal to or less than 30 GPa.

4. The thermosetting resin composition according to claim 1,
wherein a gelling time is equal to or more than 40 seconds and equal to or less than 100 seconds.

5. The thermosetting resin composition according to claim 1,
wherein a thermal conductivity of a cured product of the thermosetting resin composition is equal to or more than 0.7 W/m·K.

6. The thermosetting resin composition according to claim 1,
wherein a content of the inorganic filler is equal to or more than 50% by mass and equal to or less than 95% by mass with respect to a total of the thermosetting resin composition.

7. The thermosetting resin composition according to claim 1, wherein the inorganic filler includes crushed silica.

8. The thermosetting resin composition according to claim 1, wherein the epoxy resin includes at least one selected from the group consisting of a biphenyl-type epoxy resin, a bisphenol-type epoxy resin, a stilbene-type epoxy resin, a novolac-type epoxy resin, a polyfunctional epoxy resin, a phenol aralkyl-type epoxy resin, and a naphthol-type epoxy resin.

9. The thermosetting resin composition according to claim 1, wherein the thermosetting resin composition is in a powdered form, a granular form, a tablet form, or a sheet form.

10. A stator comprising:

a stator core having a plurality of tooth parts and a plurality of slots formed in an alternating manner in a circumferential direction;

a coil wound around each of the slots and accommodated in each of the slots, and having a pair of coil ends respectively protruding toward both sides in an axial direction from the stator core; and a sealing member provided in each of the slots by covering the coil, wherein the sealing member is formed of a cured product of the thermosetting resin composition according to claim 1.

11. The stator according to claim 10, wherein the sealing member is provided only within the slot by covering the coil.

12. The stator according to claim 10, wherein the sealing member is provided so as to cover the coil in the slot and at the same time, to cover one coil end of the pair of coil ends.

13. The stator according to claim 10, wherein the sealing member is provided so as to cover the coil in the slot and at the same time, to cover both coil ends of the pair of coil ends.

* * * * *